H. G. COLLIER.
FASTENER FOR CAR DOORS.
APPLICATION FILED OCT. 28, 1916.
1,213,155.
Patented Jan. 23, 1917.
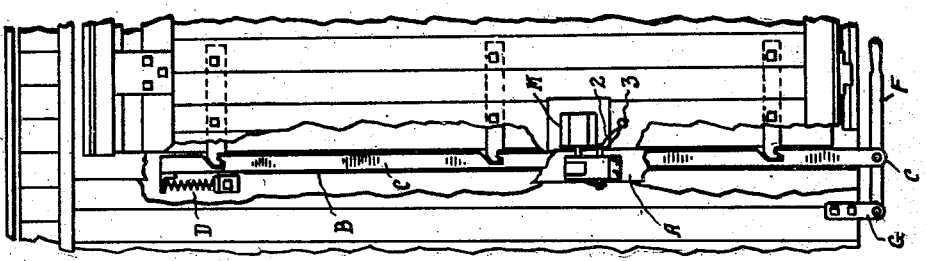
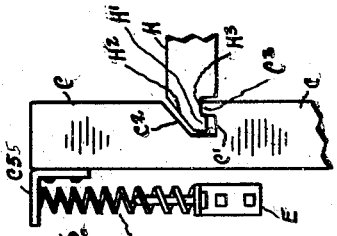
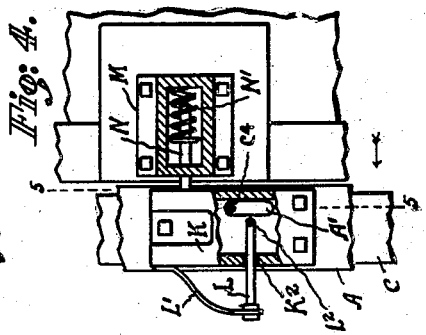
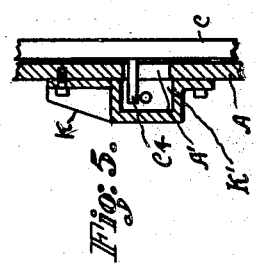
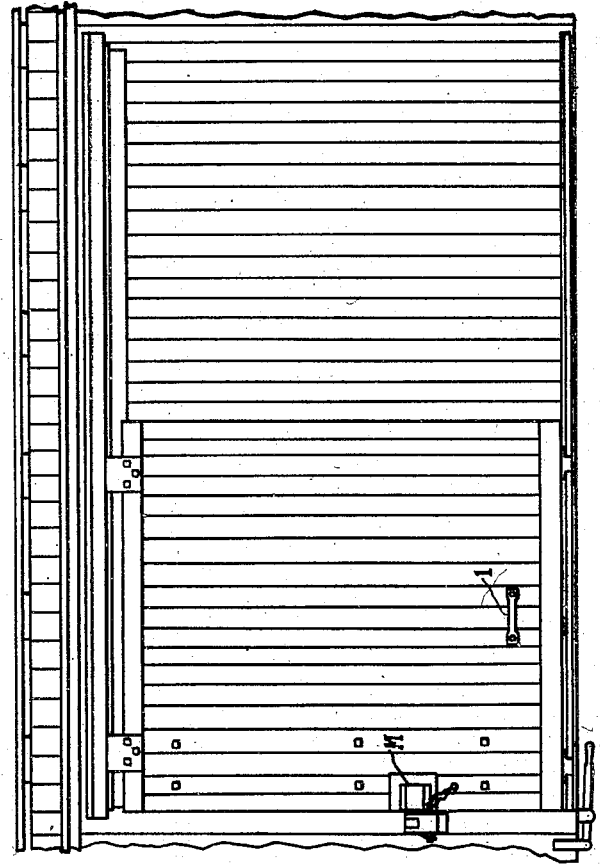
WITNESSES
INVENTOR
HARRY G. COLLIER
ATTORNEY

UNITED STATES PATENT OFFICE.

HARRY G. COLLIER, OF MUNCIE, INDIANA.

FASTENER FOR CAR-DOORS.

1,213,155.

Specification of Letters Patent.

Patented Jan. 23, 1917.

Application filed October 28, 1916. Serial No. 128,159.

*To all whom it may concern:*

Be it known that I, HARRY G. COLLIER, a citizen of the United States, residing at Muncie, in the county of Delaware and State of Indiana, have invented certain new and useful Improvements in Fasteners for Car-Doors, of which the following is a specification.

This invention relates to improvements in car closing means and has for its object to provide a construction, combination, and arrangement of parts so devised that the car door may be easily fastened at closed position and may as easily be opened.

Further objects are to provide such improved means of fastening the door at closed position that vibration of the door is reduced to a minimum and wear and tear on the locking means is obviated.

My invention is embodied in, and the purposes thereof are accomplished by the new construction, combination, and arrangement of parts shown in the accompanying drawings. The several parts of the invention, as they appear in the different views in the drawings, are identified by similar characters of reference applied thereto.

Figure 1 is a side view of a portion of a freight car, same being equipped with my invention. Fig. 2 is an enlarged view of a frontal portion of the car door, a portion thereof being broken away. Fig. 3 is a detail view of the upper portion of the lock bar. Fig. 4 is an enlarged view of the stop block and connected parts, and Fig. 5 is a transverse sectional view taken on the line 5—5 in Fig. 4, and as seen in the direction indicated by the arrow.

The car door, carried by suitable hangers and roller devices shown, is capable of being easily moved, and is properly retained against vibration and displacement.

At the frontal edge of the door opening is secured a housing A. Within this housing and between suitable guide ways B is disposed a lock bar C. This lock bar is sustained yieldably at the raised position shown. The means for so sustaining this lock bar consists of a spring D whose lower end is secured to a clip E fastened to the car frame, and whose upper end is secured to a clip $C^5$ that is fastened to the lock bar C. By means of a lever F connected to the bottom of the lock bar and which is fulcrumed to the block G, the lock bar may be readily lowered. Projecting from the front of the lock bar is a stud $C^4$ which extends through a vertical slot $A^1$ of the housing A. The function of this stud will be presently referred to.

Countersunk in the rear face of the frontal edge of the door are latch lugs H. Each of these latch lugs has the nose $H^1$ and the inclined face $H^2$ and the recess $H^3$. These parts of the latch lugs correspond respectively to the recesses $C^1$, the inclined faces $C^2$ and the teeth $C^3$ of the lock bar C. It will be observed that the relative positions of the several parts are such (see Fig. 3) that although the lock bar and the latch lugs are retained immovable, in coengagement, their coöperative action is such that when the lock bar is lowered, the tooth $C^3$ leaves the recess $H^3$, and the face $C^2$ bears against the face $H^2$.

To close and latch the door it is grasped at the suitable handle 1 and moved forwardly. The lever F is then depressed. When the door has been moved completely to the closed position the noses $H^1$ of the latch lugs will have passed the teeth $C^3$ of the lock bar. The lever F is then released. By the action of the spring D the lock bar is returned to the normal raised position. The teeth $C^3$ are now in engagement with the recesses $H^3$ and the door is latched at closed position.

Secured to the outer face of the housing A is a stop block K having an aperture $K^1$ in which the stud $C^4$ is free to move vertically. At a location immediately below the position of the stud $C^4$ when the lock bar C is at the raised and normal position shown, a transverse bore $K^2$ passes through the stop block K. A check pin L that occupies the said bore is retained by a leaf spring $L^1$ normally at position removed from the track of the stud $C^4$. Near the end of the check pin is a hole $L^2$. In a casing M that is secured to the outer face of the door at its frontal edge, a detent N is retained. This detent is urged to the projected position shown, by a coil spring $N^1$.

The relative location of the several parts of my invention, when the door is at the closed position and locked, are as shown in the drawings; (see Fig. 1) the check pin L having been moved to operative position. The lock bar being thus locked the door is then sealed by the insertion of a wire 2 its ends being brought together and secured by the usual leaden seal 3.

By the foregoing construction, combination and arrangement of parts, a door is provided which is capable of being easily moved to closed position, securely latched, and easily and effectively locked. By the latching means shown, all tendency of the door to vibrate is overcome and the retention of the door at the securely closed position is assured. There being no possibility of strain at the lock, the difficulty heretofore experienced where the seal is broken and the car has become unlocked, is overcome. Moreover, there is the facility in the opening of the door. With the breaking of the seal and the removal of the wire 2, the detent L moves to retracted position. By a depressing then of the hand lever F there is caused the contact of the faces $C^2$ and $H^2$ and the disengagement of the tooth $C^3$ from the recesses $H^3$. The action of the spring $N^1$ being then free, a rearward impulse is imparted to the door and it rolls to open position.

What I claim as my invention, and desire to be secured by Letters Patent, is:—

1. A fastener for car doors comprising a vertical lock bar having the tooth and recess, means to sustain the lock bar yieldably at raised position, a latch lug carried by the door and that has a tooth and recess to engage the tooth and recess of the lock bar, and there being inclined meeting faces on the lock bar and latch lug so coöperatively adapted that when the lock bar is depressed the teeth and recesses are disengaged and the door is forced from the closed position.

2. A fastener for car doors comprising a vertical lock bar having a tooth and recess, means to sustain the lock bar yieldably at raised position, a latch lug carried by the door and that has a tooth and recess to engage the tooth and recess of the lock bar and there being inclined meeting faces on the lock bar and latch lug so coöperatively adapted that when the lock bar is depressed the teeth and recesses are disengaged and the door is forced from the closed position, and means to check the lock bar against movement from the said engaged position.

3. A fastener for car doors comprising a vertical lock bar having the tooth and recess, a spring to sustain the lock bar at raised position, a latch lug carried by the door and that has a tooth and recess to engage the tooth and recess of the lock bar and there being inclined meeting faces on the lock bar and latch lug so coöperatively adapted that when the lock bar is depressed the teeth and recesses are disengaged and the door is forced from the closed position, and a spring actuated device to check the lock bar against movement and which is capable of being locked against release.

In testimony whereof I affix my signature in presence of two witnesses.

HARRY G. COLLIER.

Witnesses:
THOMAS L. RYAN,
GEORGE F. GELTS.